(12) United States Patent
Gordon

(10) Patent No.: US 9,878,873 B2
(45) Date of Patent: Jan. 30, 2018

(54) POWER GENERATION METHOD AND SYSTEM

(71) Applicant: Phillip Nordike Gordon, Lake Worth, FL (US)

(72) Inventor: Phillip Nordike Gordon, Lake Worth, FL (US)

( * ) Notice: Subject to any disclaimer, the term of this patent is extended or adjusted under 35 U.S.C. 154(b) by 0 days.

(21) Appl. No.: 15/512,144

(22) PCT Filed: Sep. 18, 2015

(86) PCT No.: PCT/US2015/050852
§ 371 (c)(1),
(2) Date: Mar. 17, 2017

(87) PCT Pub. No.: WO2016/044686
PCT Pub. Date: Mar. 24, 2016

(65) Prior Publication Data
US 2017/0253462 A1    Sep. 7, 2017

Related U.S. Application Data

(60) Provisional application No. 62/071,202, filed on Sep. 18, 2014.

(51) Int. Cl.
*F03G 3/00* (2006.01)
*B66B 1/44* (2006.01)
(Continued)

(52) U.S. Cl.
CPC ............... *B66B 1/44* (2013.01); *B66B 17/12* (2013.01); *F03G 3/00* (2013.01); *F03G 5/06* (2013.01); *F03G 7/10* (2013.01)

(58) Field of Classification Search
CPC ............... F03G 3/00; F03G 5/06; F03G 7/10
See application file for complete search history.

(56) References Cited

U.S. PATENT DOCUMENTS

| 4,538,415 A | 9/1985 | Lebecque |
|---|---|---|
| 7,973,420 B2 | 7/2011 | Scott |

(Continued)

FOREIGN PATENT DOCUMENTS

| DE | 102007001698 A1 | 10/2008 |
|---|---|---|
| DE | 202012011101 U1 | 2/2013 |

*Primary Examiner* — Phillip A Johnson
(74) *Attorney, Agent, or Firm* — The Concept Law Group, P.A.; Scott D. Smiley

(57) ABSTRACT

A power generation system including a partially enclosed container assembly housing a plurality of spherical balls at a container height disposed above a ground surface, each of the plurality of spherical balls having a ball weight. The power generation system also includes a conveyor assembly with a conveyor-drive system having a plurality of ball-catch members. The conveyor assembly includes a proximal end coupled to the container assembly, a distal end, and a conveyer length separating the proximal and distal ends. The conveyor assembly spans downwardly from the container assembly at a location below the container height and is operably configured, via the ball-catch members of the conveyor-drive system, to transport the spherical balls. A generator is operably coupled to the conveyor-drive system and is operably configured to produce electricity. The power generation system also includes a lift assembly having a lift-drive system spanning from a ball-receiving position to a ball-dispersing position with a height disposed above the ground surface that is greater than the container height. The lift-drive system includes a ball-platform sized to hold the plurality of spherical balls and a platform operably coupled to the lift-drive system that is sized to hold a plurality of users. The platform includes a raised position and a lowered position along a lift translation path. The raised position includes a height disposed above the ground surface that is greater than the container height. Movement of the platform of the lift-drive system along the lift translation path is (Continued)

operably configured to move the ball-platform of the lift-drive system along ball-platform translation path to transport the spherical balls to the ball-dispersing position.

9 Claims, 4 Drawing Sheets

(51) Int. Cl.
*B66B 17/12* (2006.01)
*F03G 5/06* (2006.01)
*F03G 7/10* (2006.01)

(56) References Cited

U.S. PATENT DOCUMENTS

| | | | |
|---|---|---|---|
| 8,112,992 B2* | 2/2012 | Pirincci | H02K 53/00 60/495 |
| 2008/0230322 A1 | 9/2008 | Chung | |
| 2013/0087414 A1 | 4/2013 | Takeuchi | |

* cited by examiner

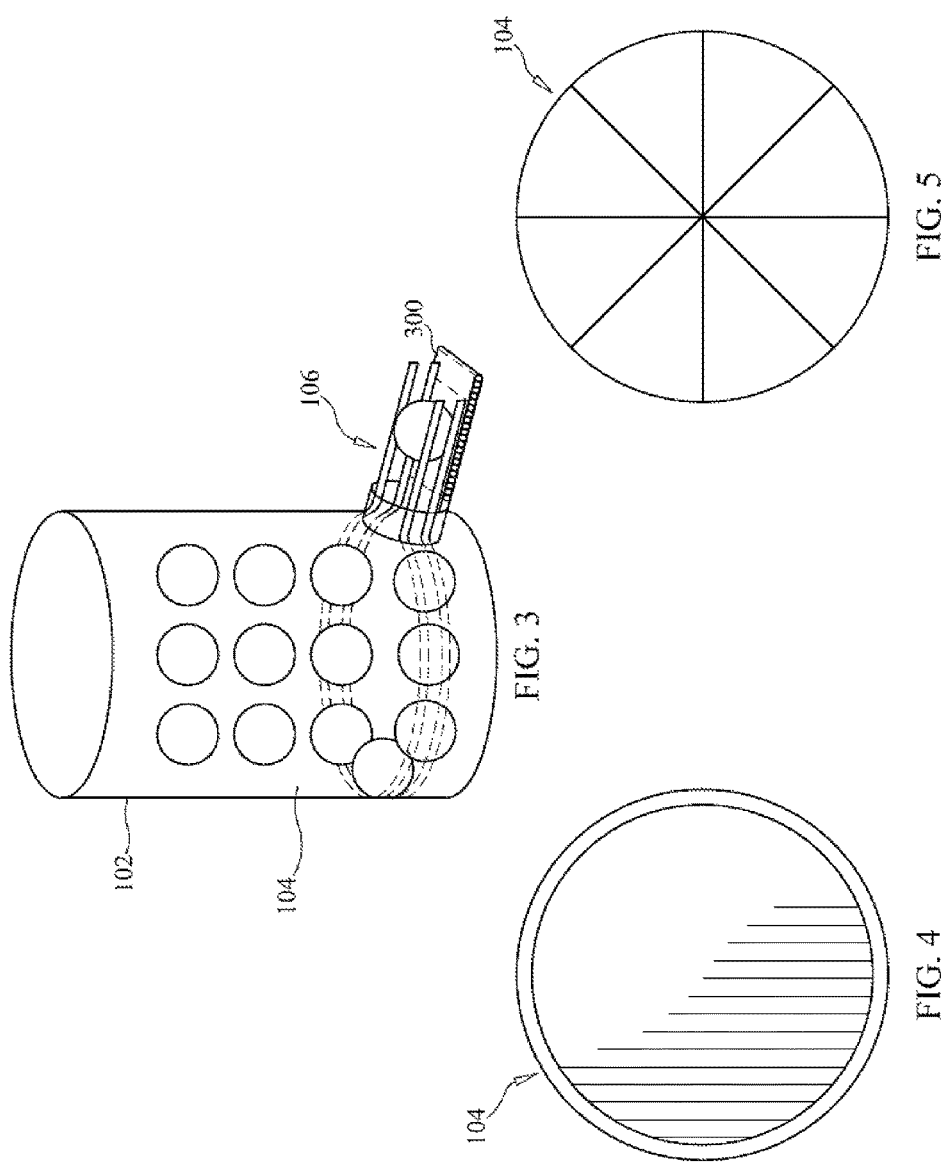

POWER GENERATION METHOD AND SYSTEM

CROSS-REFERENCE TO RELATED APPLICATION

This application claims the benefit of U.S. Provisional Patent Application No. 62/071,202 filed Sep. 18, 2014, the entirety of which is incorporated by reference.

FIELD OF THE INVENTION

The present invention relates generally to power generation, and, more particularly, relates to a power generation system that converts mechanical energy into electricity using a generator coupled to a conveyor-drive system.

BACKGROUND OF THE INVENTION

It is well known that energy is a vital component of all development programs and modern day activities. For example, energy is needed for physical comfort, the manufacture of useful materials, transportation, communication, and the like. Energy is made available through a number of methods, such as, the harnessing of natural energy flows such as moving water, solar radiation and wind, and fuels such as wood, coal, oil, and natural gas. Unfortunately, the harnessing and utilization of energy is associated with depletion and environmental damage, and other negative consequences.

Therefore, a need exists to overcome the problems with the prior art as discussed above.

SUMMARY OF THE INVENTION

The invention provides a power generation method and system that overcomes the hereinafore-mentioned disadvantages of the heretofore-known devices and methods of this general type and that converts mechanical energy into electricity using a generator coupled to a conveyor-drive system and a lift assembly.

With the foregoing and other objects in view, there is provided, in accordance with the invention, a power generation system including a partially enclosed container assembly housing a plurality of spherical balls at a container height disposed above a ground surface, each of the plurality of spherical balls having a ball weight. The power generation system also includes a conveyor assembly with a conveyor-drive system having a plurality of ball-catch members. The conveyor assembly includes a proximal end coupled to the container assembly, a distal end, and a conveyer length separating the proximal and distal ends. The conveyor assembly spans downwardly from the container assembly at a location below the container height and is operably configured, via the ball-catch members of the conveyor-drive system, to transport the spherical balls. A generator is operably coupled to the conveyor-drive system and is operably configured to produce electricity. The power generation system also includes a lift assembly having a lift-drive system spanning from a ball-receiving position to a ball-dispersing position with a height disposed above the ground surface that is greater than the container height. The lift-drive system includes a ball-platform sized to hold the plurality of spherical balls and a platform operably coupled to the lift-drive system that is sized to hold a plurality of users. The platform includes a raised position and a lowered position along a lift translation path. The raised position includes a height disposed above the ground surface that is greater than the container height. Movement of the platform of the lift-drive system along the lift translation path is operably configured to move the ball-platform of the lift-drive system along ball-platform translation path to transport the spherical balls to the ball-dispersing position.

Although the invention is illustrated and described herein as embodied in a power generation method and system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the conveyor assembly from a container height to a ground surface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 3 is a perspective view of a container assembly of the power generation system of FIG. 1 in accordance with the present invention;

FIG. 4 is a bottom elevational view of the spherical ball of FIG. 2;

FIG. 5 is a top plan view of the spherical ball of FIG. 2; and

DETAILED DESCRIPTION OF THE INVENTION

Figure 1:
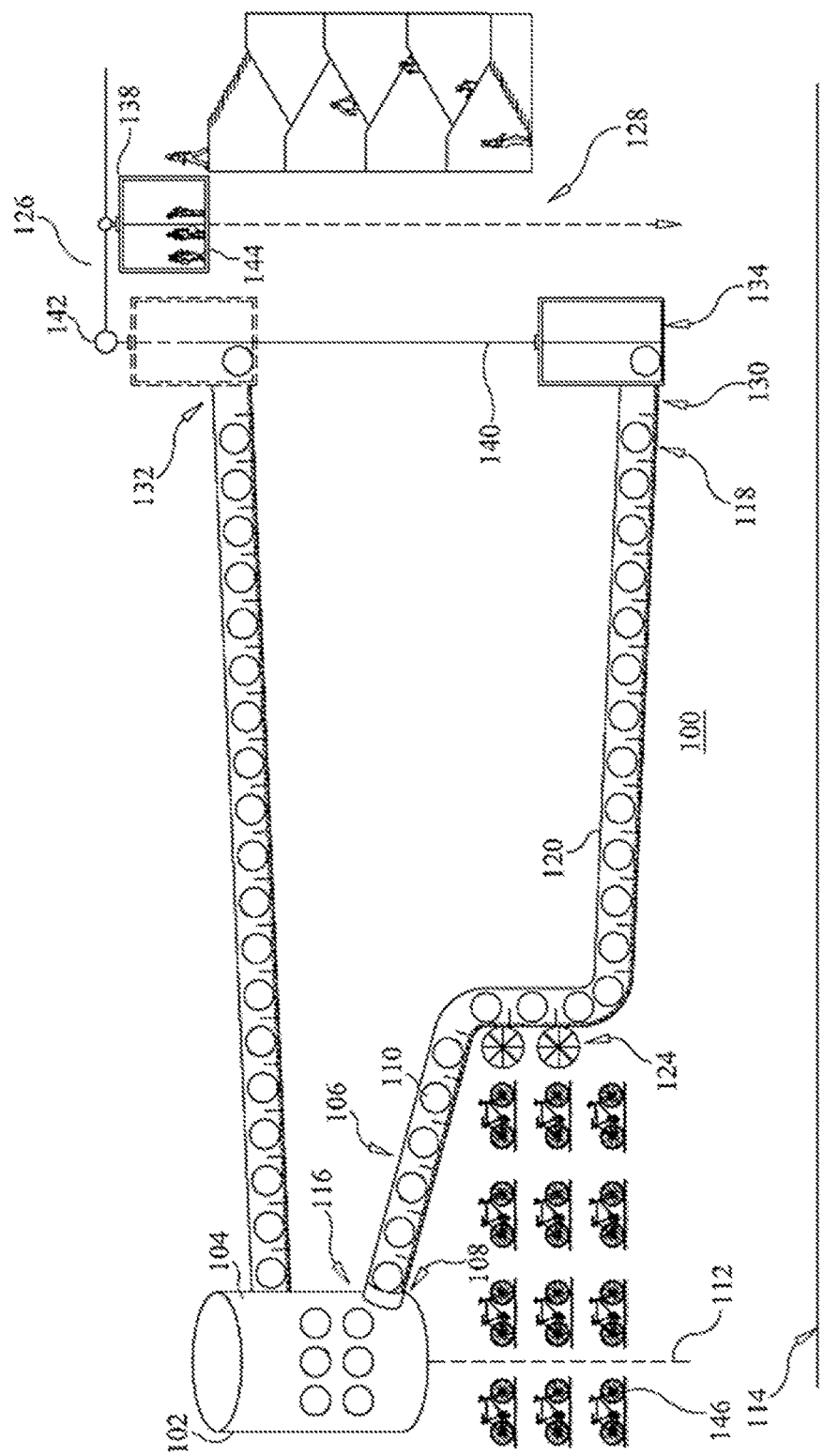
FIG. 1 is a perspective view of a power generation system in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient power generation system that converts mechanical energy into electricity using a plurality of spherical balls and a conveyor assembly having conveyor-drive system which transports the balls. The conveyor-drive system rotates is coupled to a generator operably configured to produce electricity. Embodiments of the invention also provide a lift assembly with a lift-drive system operably configured to move the balls along a ball-platform translation path in order to provide a continuous movement of the balls from the lift-drive system to the conveyor-drive system.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a power generation system 100, as shown in FIG. 1, includes a partially enclosed container assembly 102 housing a plurality of spherical balls 104. The term "partially enclosed" includes the container assembly 102 defining at least one aperture that allows the balls 104 to be dispersed from the container assembly 102 through the aperture.

Figure 2:
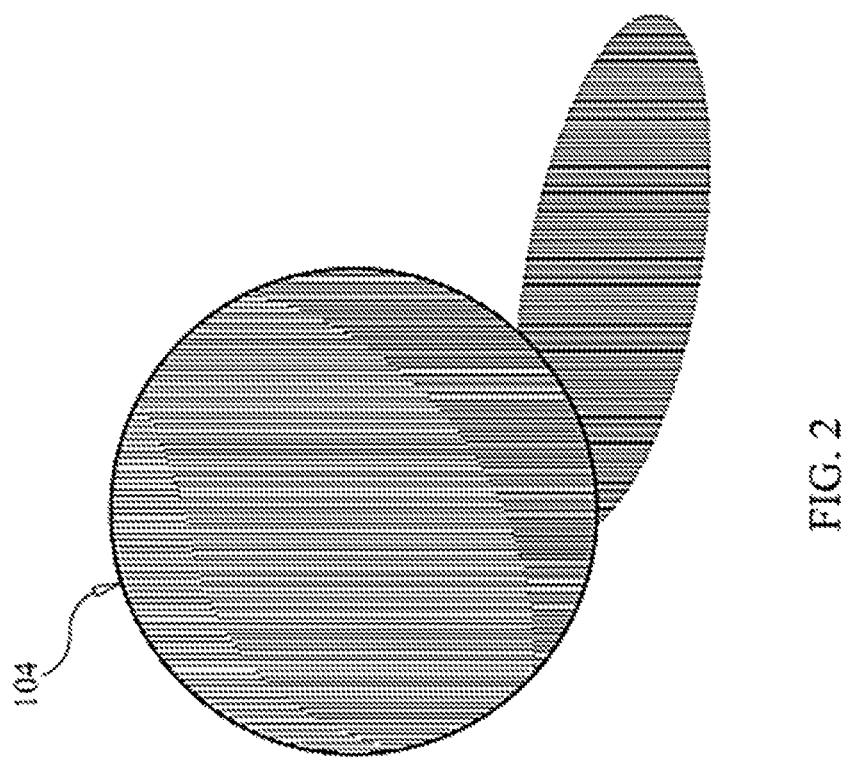
FIG. 2 is an elevational front view of a spherical ball of the power generation system of FIG. 1 in accordance with the present invention.

With brief reference to FIGS. 1-2, the balls 104 may be made of, without limitation, a steel material, a metal material, or another durable material suitable for use with the power generation system 100. In one embodiment, the balls 104 each include a weight of approximately 250-350 pounds. In other embodiments, the weight of each of the balls 104 may be outside of this range. The balls 104 are not limited to being a spherical shape; rather, may be oval, or another alternative shape. FIGS. 4 and 5 depict a bottom elevational view and a top plan view of the balls 104, respectively.

With reference again to FIG. 1, advantageously, the weight of the balls 104 is configured to assist in moving a conveyor assembly 106 having a conveyor-drive system 108 including a plurality of ball-catch members 110, as will be explained further herein. Generally speaking, the conveyor-drive system 108 may be, without limitation, a belt conveyor, a chain conveyor, a roller conveyor, or another type of conveyer.

FIG. 1 depicts the container assembly 102 at a container height 112 disposed above the ground surface 114. In one embodiment, the container height 112 is at least 12-14 feet above the ground surface 114. In such configuration, in one exemplary embodiment, when each ball 104 weighs approximately 250 pounds and the container height 112 is approximately 12 feet from the ground surface 114, the power generation system 100 may generate potential energy of approximately 3000 ft-lb of energy or 40,674 Joules. In other embodiments, the container height 112 may be outside of this range. In one embodiment, the conveyor assembly 106 includes a proximal end 116 coupled to the container assembly 102 and a distal end 118 separated from the proximal end 116 by a conveyer length 120, which may vary according to the size of the physical location of the power generation system 100.

FIG. 1 depicts the conveyor assembly 106 spanning downwardly from the container assembly 102 at a location below the container height 112. In one non-limiting embodiment, the conveyer assembly 106 spans downwardly from the container assembly 102 at approximately a ninety degree angle with respect to a ground surface 114. In one embodiment, as best shown in FIG. 3, the balls 104 move from a railing 300 coupled to the container assembly 102 to the conveyor assembly 106. Advantageously, the railing 300 is angled in a downward direction such that the balls 104 roll from the railing 300 to the conveyor assembly 106 due to gravity and without the use of any mechanical or electrical switches and/or devices which would add to the complexity and cost of the power generation system 100.

With reference again to FIG. 1, as a further advantage, the downward angle of the conveyor assembly 106 is operably configured, via the ball-catch members 110, to transport the balls 104 to along the conveyor assembly 106. In one embodiment, a generator 124 is operably coupled to the conveyor-drive system 108. Advantageously, movement of the conveyor-drive system 108 spins the generator 124, resulting in an electrical output. Said another way, the generator 124 is operably configured to produce electricity.

FIG. 1 depicts the power generation system 100 having a lift assembly 126 including a lift-drive system 128 spanning from a ball-receiving position 130 to a ball-dispersing position 132. The lift-drive system includes a ball-platform 134 configured to assist in transporting the balls 104. The lift assembly 126 includes a height 136 disposed above the ground surface 114 that is greater than the container height 112. In one embodiment, the height 136 is at least approximately 15-20 feet above the ground surface 114. In other embodiments, the height 136 may be outside of this range. The height 136 being disposed above the container height 112 allows the balls 104 to flow due to gravity from the ball-dispersing position 132 back to the container assembly 102. In such configuration, the balls 104 may flow in a continuous manner from the lift assembly 126 along the conveyer assembly 106 to the container assembly 102.

Figure 6:
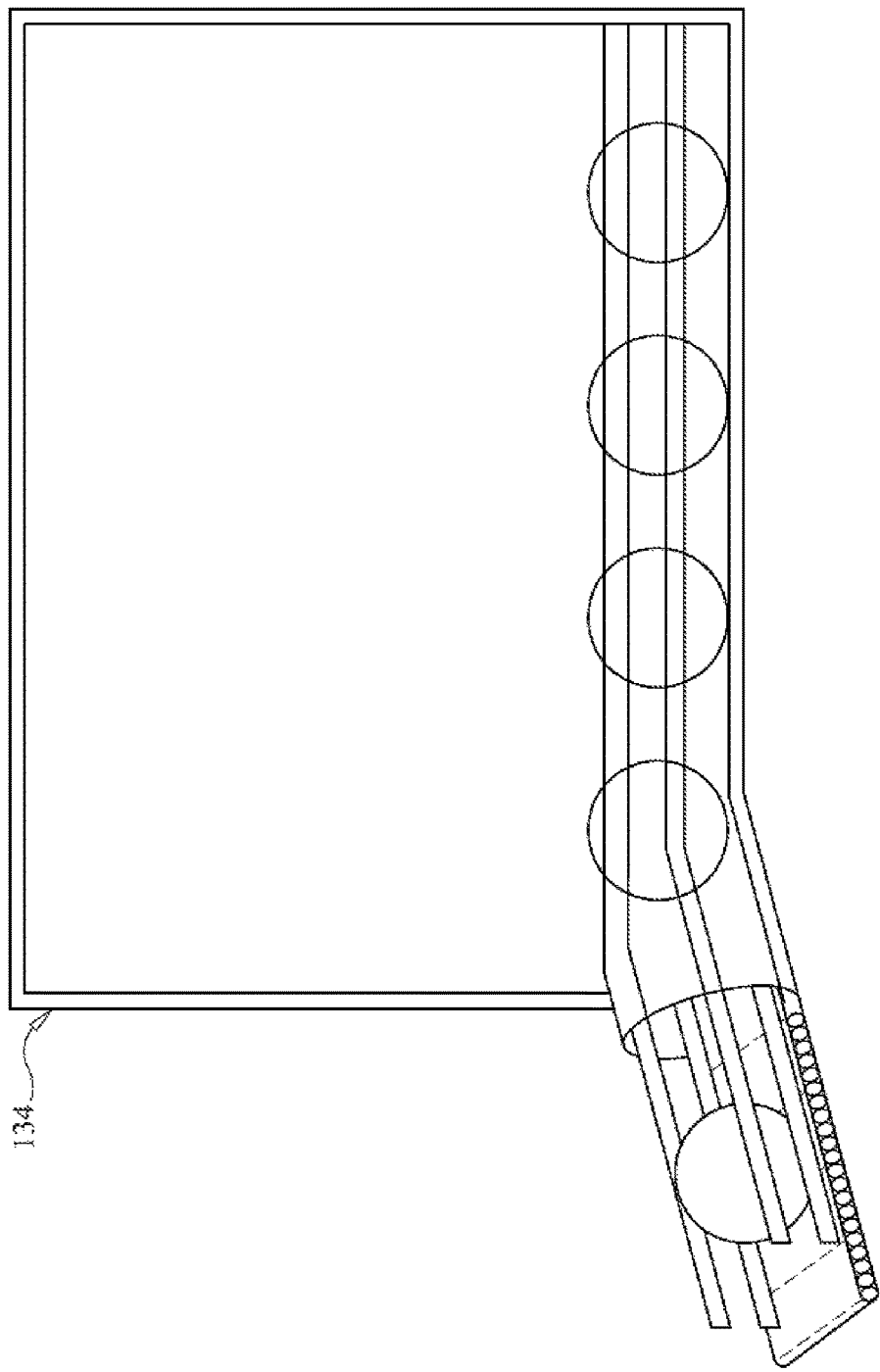
FIG. 6 is an elevational side view of a ball-platform of the power generation system of FIG. 1 in accordance with an exemplary embodiment of the present invention.

Generally speaking, the lift assembly 126 may be operably configured to operate as a pulley system. For example, with brief references to FIGS. 1 and 6, in one embodiment, the lift assembly 126 includes a platform 138 operably coupled to the ball-platform 134, through for example, and without limitation, a cable 140 and a pulley 142. The platform 138 is sized to hold a plurality of users 144. The term "users" is defined herein in its broadest possible sense and includes people, robots, or another object capable of movement. In one embodiment, the platform 138 includes a raised position and a lowered position along a lift translation path. The raised position includes the height 136 disposed above the ground surface 114 that is greater than the container height 112, as mentioned above. In one embodiment, movement of the platform 138 along the lift translation path is operably configured to move the ball-platform 134 along a ball-platform translation path to transport the balls 104 to the ball-dispersing position 132. More specifically, in one exemplary embodiment, one a designated number of users 144 enter the platform 138, the platform 138 is operably configured to move from the raised position to the lowered position, causing the ball-platform 134 to move along the ball-platform translation path from a lowered position to a raised position, i.e., the pulley system reverses the direction of the applied force. Naturally, a weight of the users and the weight of the balls 104 produces a ratio of 1:1, i.e., the weight of the users and the weight of the balls 104 is equal.

The ball-platform translation path extends substantially from the ball-receiving position 130 to the ball-dispersing position 132 of the lift-drive system 126. From the ball-dispersing position 132, the balls 104 may travel to the container assembly 102. Thereafter, the balls 104 travel along a descending directional path which extends the conveyor length 120 from the container assembly 102 back to the ball-receiving position 130. In one embodiment, the plurality of ball-catch members 110 extend outwardly from the conveyor assembly 106 and are disposed in an orthogonal relationship with respect to the descending directional path. Accordingly, such configuration assists in maintaining the balls 104 on the conveyor assembly 106 and in a spacial relationship with respect to one another as the balls 104 travel along the conveyer length 120.

With reference to FIG. 1, in one embodiment, the power generation system 100 includes a secondary electricity generation grid having a plurality of individual user-activated energy generation devices 146. In one embodiment, the plurality of individual user-activated energy generation devices 146 are operably configured to raise and lower the platform 138 of the lift assembly 126. In other embodiments, the plurality of individual user-activated energy generation devices 146 may be coupled to one or more batteries (not shown). In one embodiment, the user-activated energy generation devices 146 are pedal-powered generators, e.g., bicycles. In other embodiments, the user-activated energy generation devices 146 may be another type of exercise equipment. Advantageously, in one exemplary, non-limiting embodiment, each user-activated energy generation device 146 may be operably configured to produce at least 100-200 watt-hours of electricity during a one-hour period.

What is claimed is:
1. A power generation system comprising:
   a partially enclosed container assembly housing a plurality of spherical balls at a container height disposed above a ground surface, each of the plurality of spherical balls having a ball weight;
   a conveyor assembly with a conveyor-drive system having a plurality of ball-catch members, a proximal end coupled to the container assembly, a distal end, and a conveyer length separating the proximal and distal ends of the conveyor assembly, the conveyor assembly spanning downwardly from the container assembly at a location below the container height and operably configured, via the ball-catch members of the conveyor-drive system, to transport the spherical balls;
   a generator operably coupled to the conveyor-drive system and configured to produce electricity; and
   a lift assembly with:
      a lift-drive system spanning from a ball-receiving position to a ball-dispersing position with a height disposed above the ground surface that is greater than the container height, the lift-drive system including a ball-platform sized to hold the plurality of spherical balls; and
      a platform operably coupled to the lift-drive system and sized to hold a plurality of users, the platform having a raised position and a lowered position along a lift translation path, the raised position with a height disposed above the ground surface that is greater than the container height, wherein movement of the platform of the lift-drive system along the lift translation path is operably configured to move the ball-platform of the lift-drive system along a ball-platform translation path to transport the spherical balls to the ball-dispersing position.

2. The power generation system according to claim 1, wherein:
   the container height is at least 12-14 feet above the ground surface.

3. The power generation system according to claim 1, wherein:
   the ball weight is approximately 250-350 pounds.

4. The power generation system according to claim 1, wherein:
   the conveyor assembly includes a descending directional path from the container assembly along the conveyor length to the a ball-receiving position of the lift-drive system.

5. The power generation system according to claim 4, wherein:
   the plurality of ball-catch members extend outwardly from the conveyor assembly and are disposed in an orthogonal relationship with respect to the descending directional path.

6. The power generation system according to claim 1, further comprising:
   a secondary electricity generation grid having a plurality of individual user-activated energy generation devices operably configured to raise and lower the platform of the lift assembly.

7. The power generation system according to claim 6, wherein:
   the individual user-activated energy generation devices are bicycles.

8. The power generation system according to claim 1, wherein:
   the height of the lift assembly is at least approximately 15-20 feet above the ground surface.

9. The power generation system according to claim 1, wherein:
   the ball-platform translation path extends substantially from the ball-receiving position of the lift-drive system to the ball-dispersing position of the lift-drive system.

* * * * *